C. A. DYSLE.
FIRELESS BROODER.
APPLICATION FILED FEB. 21, 1910.
981,986.
Patented Jan. 17, 1911.
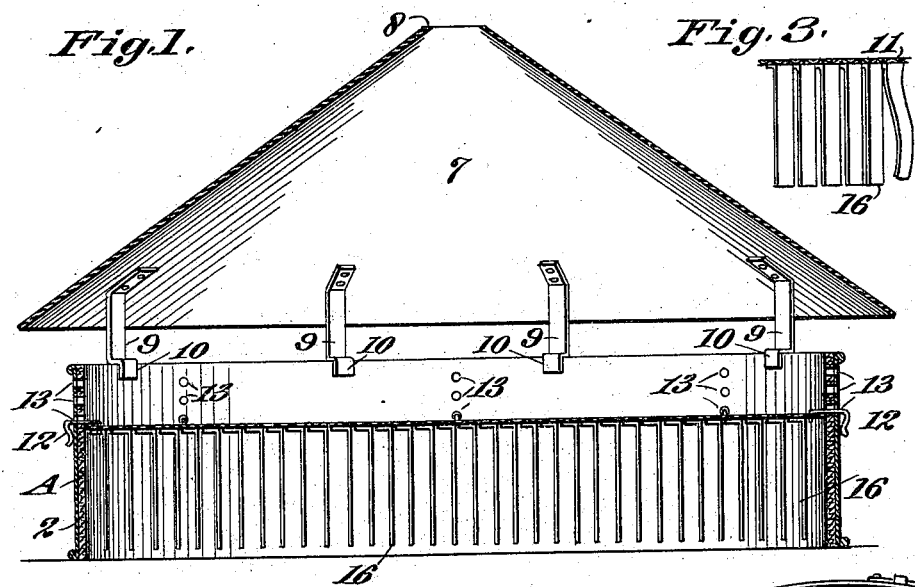
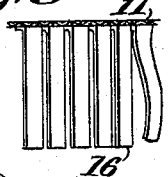
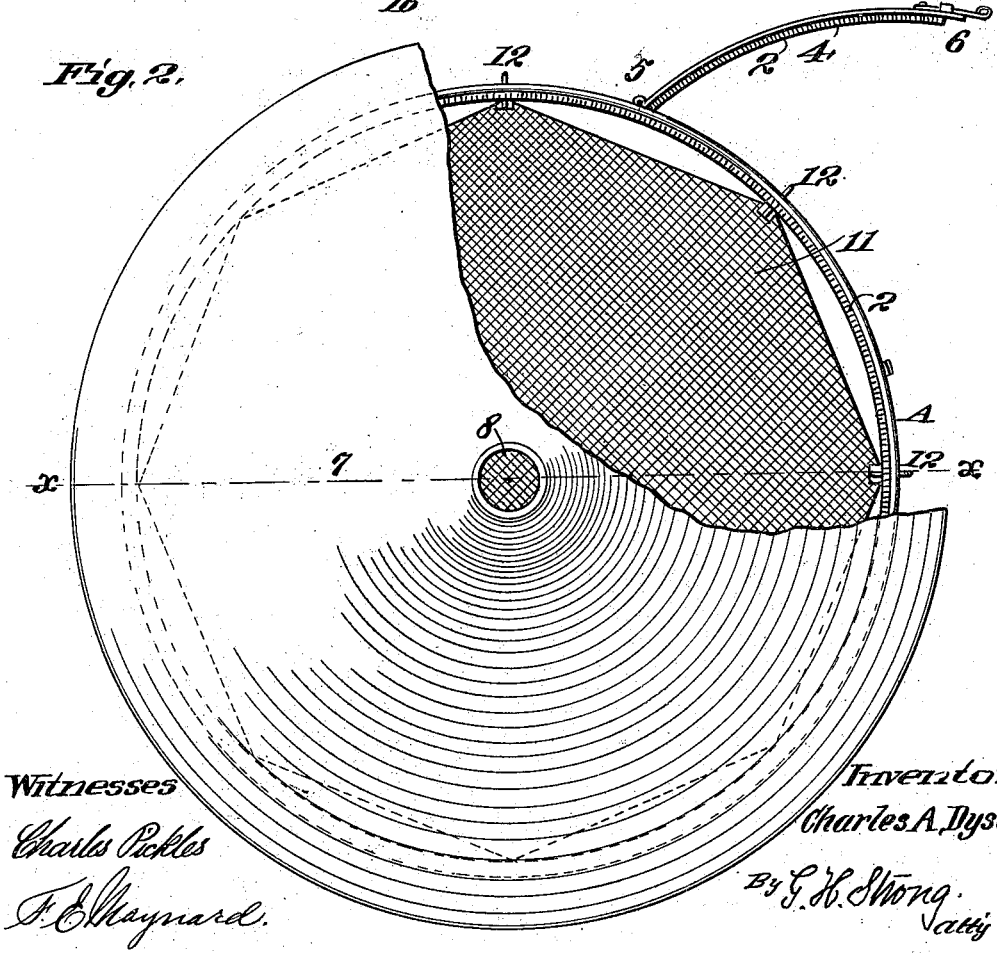

UNITED STATES PATENT OFFICE.

CHARLES A. DYSLE, OF GRATON, CALIFORNIA.

FIRELESS BROODER.

981,986.     Specification of Letters Patent.     Patented Jan. 17, 1911.

Application filed February 21, 1910. Serial No. 544,975.

*To all whom it may concern:*

Be it known that I, CHARLES A. DYSLE, citizen of the United States, residing at Graton, in the county of Sonoma and State of California, have invented new and useful Improvements in Fireless Brooders, of which the following is a specification.

This invention relates to brooders, and particularly pertains to a fireless brooder.

It is the object of this invention to provide a brooder for sheltering and mothering young chicks, in which the necessary warmth required for the preservation and health of the young fowls is generated by the heat radiating from their bodies, and which is retained by the use of non-conducting coverings, such as wool fabrics and the like, thus dispensing with the use of artificial heat usually employed in brooders.

A further object is to provide means for adjusting the brooder to use for chicks of several sizes, and particularly to supply a means for furnishing proper and essential ventilation.

The invention consists of the parts and the construction and combination of parts as hereinafter more fully described and claimed, having reference to the accompanying drawings, in which—

Figure 1 is a vertical section of the invention on the line $x$—$x$, Fig. 2. Fig. 2 is a plan view with a portion of the cover broken away. Fig. 3 is a fragmentary section of a portion of the hover.

In the drawings, A represents the casing or side portion of the brooder which is constructed in the form of a hoop or ring usually made of sheet-metal, such as galvanized iron, and about six or eight inches in height. The inside of the casing A is lined with a non-conductor of heat and cold, such as felt or other woolen fabrics, indicated at 2, and particularly designed to keep in the heat and exclude the cold. The casing A is provided with a swinging curved door 4, hinged at 5, and locked by a suitable catch 6. A conical shaped cover 7 is provided and has an opening 8 at its apex through which heated air may rise and pass out of the brooder. The lower edge of the cover 7 is adapted to extend beyond the sides of the casing A so as to form an overhanging eave, and the cover is spaced a little above the casing A by the brackets or legs 9 which are secured to the inside of the cover 7 near its lower edge and disposed at suitable intervals thereon. The lower ends of these legs 9 are formed hook-shape, or flanged, as shown at 10, to adapt them to rest removably upon the upper edge of the casing or wall A, so as to elevate the cover 7 above the casing A and thus form a fresh air inlet, and also to allow the cover to be easily removed when it is desired to have access to the inside of the brooder.

Within the brooder is a hover for the chicks formed of an octagonal sheet of fabric 11 stretched across the inside of the casing A and held in place by means of hooks 12, one of which is placed at each angle of the sheet 11 and is adapted to pass through corresponding perforations 13 in the casing A. As a means of adjusting the sheet 11 at different heights in the casing A, so as to accommodate the brooder to chicks of various sizes and ages, the perforations 13 are arranged in vertical rows, as shown, so that the hover may be hung at different levels from the ground or floor. The under side of the sheet 11 is provided with a number of depending strips of flannel or felt 16 which are sewed on the sheet 11 in rows at intervals of about one inch apart, and between which strips 16 the chicks seek shelter and warmth.

In the application of the invention, the sheet 11, with its depending strips 16, is arranged in the casing A according to the size of the young fowls to be mothered, the hooks 12 engaging the lowermost of the perforations 13 for small sized chicks, or the uppermost series of perforations for the largest chicks. The casing A is then preferably placed upon a bedding of straw or on dry ground or on the floor, as the case may be, and the cover 7 placed thereon. The young chicks may be placed within the brooder either through the door opening or by removing the cover 7 and placing them under the sheet 11 by loosening one of the hooks 12 and lifting a portion of the sheet 11 upward. The brooder being placed on the ground, and the door 4 opened, the chicks are free to run in and out of the device at will.

The animal heat generated by the brood of chicks is found by experience to be quite sufficient, even in freezing weather, to warm the interior of the brooder sufficiently; and the space between the casing A and cover 7, in conjunction with the opening 8 in the apex of the latter, permits of a free circulation of fresh air. This circulation and ventilation taking place as it does, above the sheet 11, does not subject the hovered chicks to any detrimental drafts.

The important features of this invention are: 1st. The inclosed padded brooding casing A, with the hover providing a practical, fireless brooder. 2nd. The means and method of ventilation whereby the chicks are protected from drafts. 3rd. The removable hood or top which, besides affording shelter and ventilation, allows the inside of the brooder to be easily gotten at. 4th. The adjustment of the hover to different levels to adapt it for chicks of different sizes. 5th. The making of the casing round so that there are no angles or corners into which the chicks may become jammed or lost and confused, and padding the inside of this round casing, and affording a passageway all around it on the inside and between it and the pendent hover flaps 16, so that the chicks can easily get out whenever the door is opened without blindly running back and forth into some dark angle or corner, as in the case of the use of the ordinary square or polygonal brooder.

Having thus described my invention, what I claim and desire to secure by Letters Patent is—

1. A brooder comprising a cylindrical casing padded on the inside, a hover consisting of a horizontally arranged strip of fabric with pendent strips between which chicks may move, and fastening devices forming horizontal extensions of the hover and adapted to engage the vertical wall of the casing to adjustably suspend the hover.

2. A brooder comprising a cylindrical casing padded on the inside, a hover consisting of a horizontally arranged strip of fabric, said fabric having pendent strips between which the chicks may move, and having its edges provided with fastenings, the vertical wall of the casing having means for engaging said fastenings and suspending the hover at different distances from the bottom of the casing.

3. A brooder comprising a cylindrical casing padded on the inside, a hover consisting of a horizontally arranged strip of fabric with pendent strips between which the chicks may move, fastening devices on the outer edges of the hover and vertical rows of co-acting fastening members with which the first-named members engage to hold the hover at different elevations, and a conical hood or cover for the casing having its lower edge overhanging and slightly spaced above the top of the casing.

4. A brooder comprising a cylindrical casing padded on the inside, a hover consisting of a horizontally arranged strip of fabric with pendent strips between which the chicks may move, and interengaging fastenings between the outer edge of the hover and the vertical wall of the casing, the fastenings on the casing being in vertical rows to allow the hover to be adjusted to different elevations.

5. In a brooder, the combination of a cylindrical casing, a horizontally supported hover therein, a conical hood covering and resting on the casing, and means for supporting the hover at different levels, said means including vertical rows of perforations in the side walls of the casing and hook members on the edges of the hover detachably engaging said perforations.

In testimony whereof I have hereunto set my hand in the presence of two subscribing witnesses.

CHARLES A. DYSLE.

Witnesses:
H. L. ATKINSON,
LILLIAN MATZEN.